US010289582B2

(12) United States Patent
Mishra et al.

(10) Patent No.: US 10,289,582 B2
(45) Date of Patent: *May 14, 2019

(54) ENHANCED SERIAL PERIPHERAL INTERFACE

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,067

(22) Filed: May 24, 2018

(65) Prior Publication Data

US 2018/0267916 A1  Sep. 20, 2018

Related U.S. Application Data

(63) Continuation of application No. 14/860,568, filed on Sep. 21, 2015, now Pat. No. 9,990,316.

(51) Int. Cl.
| | | |
|---|---|---|
| *G06F 3/00* | (2006.01) | |
| *G06F 13/42* | (2006.01) | |
| *G06F 13/00* | (2006.01) | |
| *G06F 13/362* | (2006.01) | |
| *G06F 13/40* | (2006.01) | |

(52) U.S. Cl.
CPC ........ *G06F 13/362* (2013.01); *G06F 13/4068* (2013.01); *G06F 13/4282* (2013.01); *G06F 13/4291* (2013.01)

(58) Field of Classification Search
CPC ............... G06F 13/362; G06F 13/4068; G06F 13/4282; G06F 13/4291
USPC .......................... 710/3–4, 105, 110; 709/216
See application file for complete search history.

(56) References Cited

U.S. PATENT DOCUMENTS

| | | |
|---|---|---|
| 5,878,234 A | 3/1999 | Dutkiewicz et al. |
| 7,287,208 B2 | 10/2007 | Dybsetter et al. |
| 7,304,950 B2 | 12/2007 | Dybsetter et al. |
| 7,467,204 B2 | 12/2008 | Fields, Jr. et al. |
| 8,516,174 B2 | 8/2013 | Goerlich et al. |
| 8,667,194 B2 | 3/2014 | Dybsetter et al. |
| 8,719,613 B2 | 5/2014 | Neben |
| 8,732,366 B2 | 5/2014 | Fugate et al. |
| 8,892,935 B2 | 11/2014 | Lee |
| 8,949,478 B2 | 2/2015 | Wright |
| 9,003,091 B2 | 4/2015 | Heinrich et al. |
| 2002/0108011 A1 | 8/2002 | Tanha |
| 2006/0143348 A1 | 6/2006 | Wilson et al. |
| 2008/0183928 A1 | 7/2008 | Devila et al. |
| 2009/0193165 A1 | 7/2009 | Hsieh et al. |
| 2010/0131676 A1 | 5/2010 | Escamilla |

(Continued)

OTHER PUBLICATIONS

International Search Report and Written Opinion—PCT/US2016/049105—ISA/EPO—dated Nov. 24, 2016.

*Primary Examiner* — Farley Abad
*Assistant Examiner* — Henry W Yu
(74) *Attorney, Agent, or Firm* — Haynes and Boone, LLP (57) ABSTRACT

A modified serial peripheral interface (SPI) is provided in each of a master device and a plurality of slave devices that does not use a slave select line. The master device may thus engage in full-duplex serial communication with each slave device through an SPI MOSI line, an SPI MISO line, and an SPI clock line.

16 Claims, 4 Drawing Sheets

(56) References Cited

U.S. PATENT DOCUMENTS

| | | |
|---|---|---|
| 2013/0275636 A1 | 10/2013 | Decesaris et al. |
| 2013/0297829 A1 | 11/2013 | Berenbaum et al. |
| 2015/0378959 A1 | 12/2015 | Jones et al. |
| 2017/0083467 A1 | 3/2017 | Mishra et al. |

ENHANCED SERIAL PERIPHERAL INTERFACE

RELATED APPLICATION

This application is a continuation of U.S. application Ser. No. 14/860,568 filed Sep. 21, 2015, the content of which is hereby incorporated by reference in its entirety.

TECHNICAL FIELD

This application relates to serial peripheral interfaces, and more particularly to an enhancement of a serial peripheral interface so as to obviate the need for a slave select line.

BACKGROUND

A serial peripheral interface (SPI) is commonly included in mobile devices to provide synchronous serial communication between a system-on-a-chip (SoC) processor and various peripheral devices. The SoC functions as an SPI master device whereas each peripheral device functions as a slave SPI device. An SPI bus couples the master device to each SPI slave devices. The master device supplies a clock to a clock line in the SPI bus. All serial data exchanges between the master device and the slave devices are synchronous to the clock signal. The master device drives data to the slave devices over a master-out-slave-in (MOSI) line. The slave devices may each drive data to the master on a shared master-in-slave-out (MISO) line. Since the MISO line is shared by the slave devices, the SPI bus also includes a slave select line for each slave device to provide an access protocol to the shared MISO line.

As each slave has its own the slave select line, the SPI bus at each slave device is a four-wire bus to accommodate the clock, MOSI, MISO, and slave select signaling. But the SPI bus at the master device will be a (3+N) wire bus, where N is an integer representing the number of slave devices Each wire in the SPI bus is dedicated to its own pin such that the number of pins at the master device dedicated to the SPI bus grows with the number of slave devices it services. As a result, fewer pins in a master device such as an SoC may be dedicated for other signaling. Moreover, each required additional pin on the master device raises manufacturing costs.

Accordingly, there is a need in the art for an improved SPI interface that alleviates the pin demands of conventional SPI architectures.

SUMMARY

Enhanced serial peripheral interfaces are provided for a master device and a plurality of slaves. Each enhanced serial peripheral interface (which may also be denoted as a modified serial peripheral interface (SPI)) is configured to enable data transmission from the master device over a master-out-slave-in (MOSI) line and from the slave devices to the master device over a master-in-slave-out (MISO) line without the use of slave select lines. The resulting system thus benefits from the duplex data transmission over the MOSI and MISO lines without the need for a plurality of slave select pins in the master device. As used herein, "pin" is a generic term to cover the structure such as a pad or an actual pin that an integrated circuit uses to couple to leads on circuit board or other suitable transmission lines.

The modified SPI in the master device is configured to insert an address header into addressed frames transmitted over the MOSI line to the slaves. The modified SPI in each slave device is configured to decode the address header in the received addressed frames from the MOSI line to determine if the received addressed frames are addressed to the slave device.

To provide an access protocol for the slave device to the shared MISO line given the absence of the slave select lines, the modified SPI in the master device may periodically poll each slave device with an addressed polling frame having an address header. Should a modified SPI in a slave device determine that a received addressed polling frame was directed to the slave device, it may proceed to transmit a data frame to the master device over the MISO line. Alternatively, each slave device may include an interrupt pin coupled to an individual interrupt line received by the master device. Should such a slave device have a frame to transmit to the master device, it may first interrupt a host processor in the master device. The identity of the interrupting slave device is then known to the master device through the corresponding individual interrupt line. The slave-device-generated frames need not be addressed frames given these access protocols for the MISO line.

BRIEF DESCRIPTION OF THE DRAWINGS

Additional aspects of the present disclosure and their advantages are best understood by referring to the detailed description that follows. It should be appreciated that like reference numerals are used to identify like elements illustrated in one or more of the figures.

DETAILED DESCRIPTION

A modified serial peripheral interface (SPI) is provided in which the slave select lines are eliminated. In this fashion, a master device and a plurality of slave devices may be networked through respective modified serial peripheral interfaces using a three-wire modified SPI bus. The master device thus needs only three pins to support its modified serial peripheral interface regardless of the number of slave devices that are networked to the interface.

Since the slave select lines are deleted, the modified serial peripheral interface in the master device is configured to transmit addressed frames to the slave devices over a master-out-slave-in (MOSI) line, wherein each addressed frame includes a header with an address for a selected slave device. To provide the addresses, the master and slave devices may each include an embedded inter-integrated circuit (I2C) interface or an embedded I3C (Sensewire) interface as defined by the MiPi Alliance. More generally, the master and slave devices may each include an embedded address assignment engine. The following discussion will thus assume without loss of generality that the embedded address assignment engine is an I2C interface.

The embedded I2C interface functions upon completion of a power-on sequence such as upon completion of a power-on reset (POR) sequence. As known in the I2C and I3C arts, the IC2 bus is a two-wire bus. The embedded I2C interface thus shares the clock line and the MISO line in the 3-wire SPI bus used by the modified serial peripheral interfaces. The embedded I2C interface and the modified serial peripheral interface the master device (and also the slave devices) may select for the clock line and the MISO line through a corresponding multiplexer.

Upon completion of the power-on reset sequence, the embedded I2C interface in the master device begins clocking the shared clock line. The master device is also configured to weakly charge the MISO line to a power supply voltage VDD. Each embedded I2C interface in the slave devices is configured to count responsive to the toggling of the clock line to maintain a local count. For example, each embedded I2C interface in the slave devices may be configured to count each rising edge or each falling edge of the clock signal to maintain its local count. Alternatively, each embedded I2C interface in the slave devices may be configured to count each rising edge and each falling edge of the clock signal to maintain its local count. Each slave device embedded I2C interface is configured with an initial address such as an N-bit pseudorandom or random address. After each increment of its local count, each slave device embedded I2C interface compares its current local count to its initial address.

When a comparison indicates that the current local count equals a slave device's initial address, the slave device's embedded I2C interface discharges the shared MISO line low to ground to signal to the master device that a slave device has an initial address equaling the corresponding current local count. The embedded I2C interface in the master device also includes a counter that counts responsive to the transitions of the clock signal in the same fashion as the counters operate in the slave devices. Prior to integration of the master device and the slave devices into a given system, the master device is configured with the total number of slave devices. For example, the number of slave devices may be written into a read-only memory such as a FLASH memory in the master device. The embedded I2C interface in the master device thus continues to cycle the clock signal until the total number of slave devices have identified their initial addresses. The master device then possesses the initial address for each of the slave devices.

The modified SPI interface in the master device may then proceed to assign abbreviated addresses to the slave devices through the MOSI line. For example, if there are eight or fewer slave devices, 3 address bits are sufficient to uniquely identify all the slave devices. In other implementations, a fixed abbreviated address size may be used that is sufficiently large to accommodate the expected number of slaves devices. The modified serial peripheral interface in the master device may begin toggling the clock line while sending an addressed configuration frame to a first one of slave devices through the MOSI line. The addressed configuration frame includes a header with the first slave device's initial address and contains a frame body that identifies the first slave device's abbreviated address. The first slave device's embedded I2C interface may then transmit an acknowledgement frame over the MISO line responsive to the toggling of the clock line by the modified serial peripheral interface in the master device. In this fashion, the master device may proceed to assign the remaining abbreviated addresses to the remaining slaves as discussed with regard to the first slave device. As used herein, the term "address" without further limitation refers to the abbreviated addresses for brevity.

After assignment of the addresses, the modified serial peripheral interfaces in the master device and slave devices may begin exchanging data in a normal or mission mode of operation. To send an addressed frame of data to a particular one of the slave devices, the modified serial peripheral interface in the master device is configured to insert the address for the desired slave device into a header for the addressed frame. Like the other frame types discussed herein, the bit length of an addressed frame may vary depending upon a given system's requirements. Regardless of the frame length, it is a parameter that the slave devices and the master device may be configured with using an appropriate non-volatile memory. The modified serial peripheral device in the master device may then proceed to shift out the addressed frame bit-by-bit onto the MOSI line responsive to transitions of the clock signal. Each slave device receives the addressed frame over the MOSI line responsive to transitions of the clock signal as transmitted over the clock line. Each slave device's modified peripheral interface is configured to examine the header of the received addressed frame to determine whether the received addressed frame is addressed to the corresponding slave device. Only the modified serial peripheral interface in the addressed slave device will have its address equaling the address in the header, whereupon it proceeds to process the data payload in the received addressed frame.

Transmission from a slave device to the master device is analogous. However, the modified serial peripheral interfaces in the slave devices may transmit frames without any address header to the master device over the MISO line analogous to the frame transmissions from slave devices in a conventional SPI system. In contrast to conventional SPI slave devices, the slave devices disclosed herein do not use a slave select line as the access protocol with regard to the MISO line. The access protocol practiced by the slave devices is discussed further below. Once a slave device has access to the MISO line, its modified serial peripheral interface may proceed to shift the resulting frame out onto the MISO line responsive to transitions of the clock signal received on the clock line.

The resulting combination of a modified serial peripheral interface and an embedded I2C interface in each of the master and slave devices is quite advantageous in that each device supports the full duplex communication offered the MISO and MOSI lines yet the master device need devote only three pins to communicate with a plurality of slave devices. In this fashion, manufacturing costs are reduced yet the master device and the slave device may engage in full duplex serial communication. These advantageous features may be better appreciated through a consideration of the following example implementations.

Figure 1:
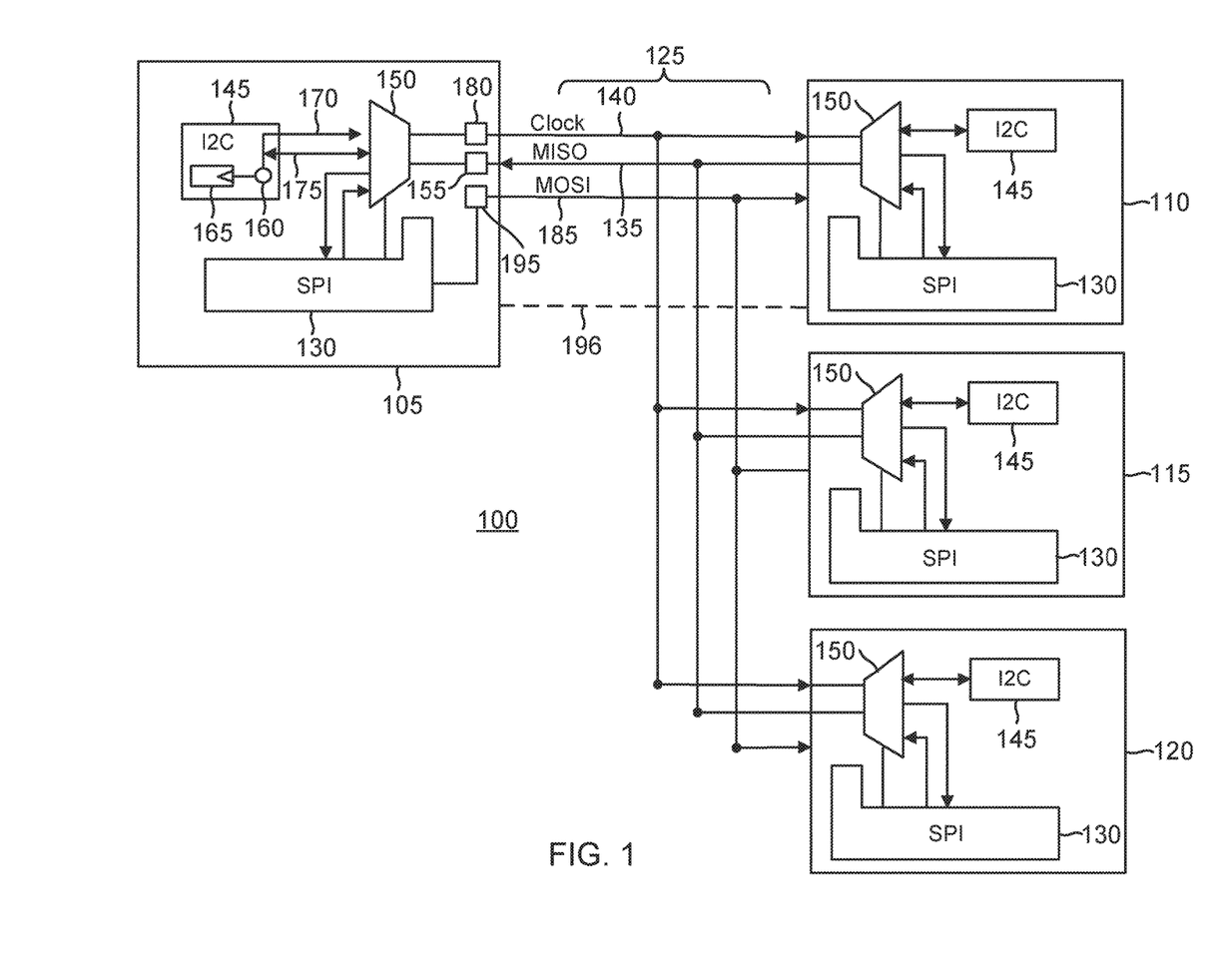
FIG. 1 is a diagram of an example system including a master device and a plurality of slave devices configured to communicate over a modified SPI bus that does not include any slave select lines in accordance with an aspect of the disclosure.

Turning now to the drawings, an example networked system 100 is shown in FIG. 1. A master device 105 such as a system-on-a-chip (SoC) includes a modified serial peripheral interface 130 for communicating over a three-wire modified SPI bus 125 with a plurality of slave devices such as a slave device 110, a slave device 115, and a slave device 120. Serial peripheral interface 130 shares one of the data lines in bus 125 such as a MISO line 135 and also a clock line 140 with an embedded I2C interface 145 through a multiplexer 150. An I/O circuit (endpoint) 155 in master device 105 performs the physical layer processing for the received signals over MISO line 135.

Following a completion of a power-on reset (POR) sequence such as responsive to a POR signal (not illustrated), a controller in master device 105 such as modified serial peripheral interface 130 commands its multiplexer 150 to select an I2C clock signal 170 from an I2C clock source 160 to drive clock line 140 through a corresponding endpoint 180 to initiate an address assignment mode in which the initial addresses for the slaves is identified. In response to the completion of the POR signal sequence, I2C clock source 160 cycles I2C clock signal 170. Endpoint 155 is configured to weakly charge MISO line 135 to the power supply voltage VDD so that MISO line 135 stays charged while I2C clock source 160 continues to cycle the I2C clock signal 170 over clock line 140. During this address assignment mode, multiplexer 150 couples a received MISO signal from endpoint 155 to an I2C data line 175 in master device 105.

Figure 2:
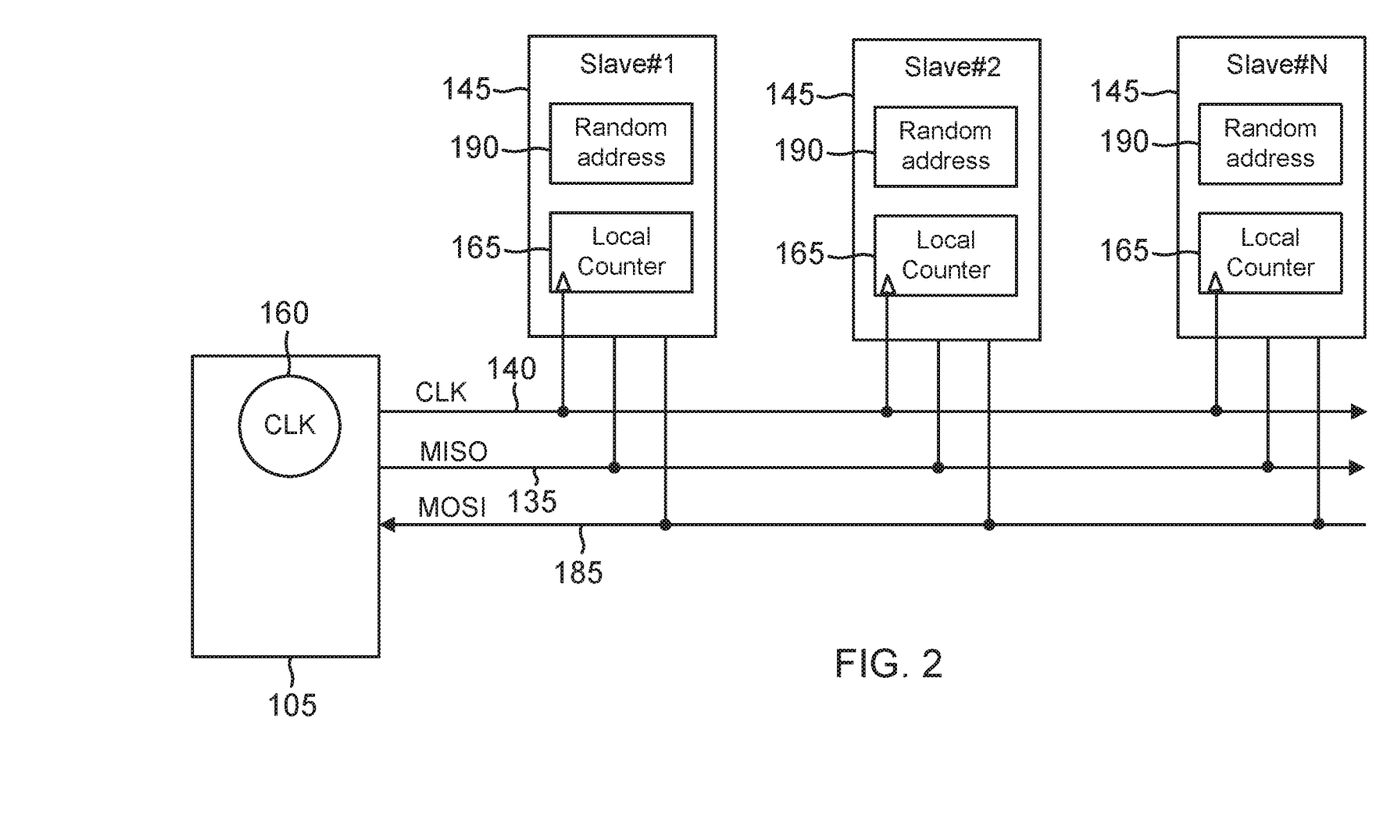
FIG. 2 is a diagram of the system of FIG. 1 during an address assignment procedure.

Each slave device includes an analogous embedded I2C interface 145, multiplexer 150, and modified serial peripheral interface 130. However, the embedded I2C interfaces 145 in the slave devices need not contain an I2C clock source 160 as I2C clock 170 is driven by master device 105. In addition, the endpoints for the slave devices are not shown in FIG. 1 for illustration clarity. Following the completion of the power-on reset sequence and the cycling of clock line 140, each slave device begins counting the cycles (or half cycles depending upon whether both clock edges are counted). As shown in FIG. 2, each slave device's embedded I2C interface 145 stores a random number (or pseudo-random) address 190, which may also be designated as an initial address 190. A local counter 165 in each slave device embedded I2C interface 145 counts responsive to the cycling of clock line 140 from I2C clock source 160 in master device 105. When a slave device embedded I2C interface 145 determines that the count from its local counter 165 equals its initial address 190, it discharges MISO line 135 to ground. Referring again to FIG. 1, endpoint 155 in master device 105 is configured to weakly charge MISO line 135 to the power supply voltage VDD. The slave devices can thus overcome this weak pull-up on MISO line 135 to signal master device 105 that their local count equals their initial address 190. The master device I2C interface 145 also includes a local counter 165 that maintains a master local count that mirrors the local counts determined by the local counters 165 in the slave devices responsive to cycling of clock signal 170 from I2C clock source 160. Master device I2C interface 145 is thus alerted that a slave device has indicated that its initial address 190 equals the current master count by the discharge of MISO line 135. Since master device I2C interface 145 is also configured with the total number of slave devices in system 100, it may continue to oscillate clock signal 170 until all the slave devices have identified their initial address 190. Modified SPI interface 130 may then proceed to transmit an addressed configuration frame over MOSI line 185 that is addressed to a particular slave device using its initial address 190 to alert the slave device of its abbreviated address as discussed earlier. In alternative implementations, each slave devices may alert master device 105 that their local count matches their initial address by discharging MOSI line 185 instead of discharging MISO line 135. A corresponding endpoint 195 for driving MOSI line 185 in master device 105 may thus be configured to weakly charge MOSI line 185 to the power supply voltage VDD. Regardless of whether a slave device alerts master device 105 using MISO line 135 or MOSI line 185 of a match between its local count and its initial address 190, the resulting discharge of MISO line 135 or MOSI line 185 may have a duration of a just a bit period although longer durations may be used in alternative implementations.

Figure 3:
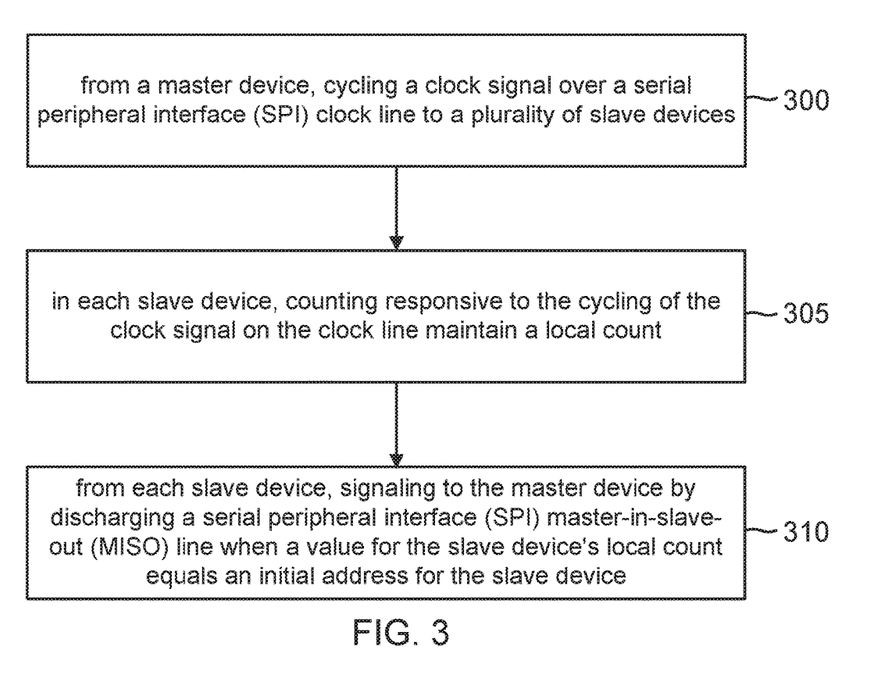
FIG. 3 is a flowchart of a method of assigning addresses in the system of FIG. 1.

Embedded I2C interface 145 in master device 105 may thus be also designated as an address assignment engine 145. Such an engine may be implemented using software or firmware and need not have any I2C or I3C functionality. Alternatively, address assignment engine 145 may be implemented using a finite state machine. Similarly, each modified serial peripheral interface 130 may be implemented using software, firmware, or a finite state machine. The method practiced by address assignment engine 145 may be summarized with regard to the flowchart shown in FIG. 3. The method also includes an act 300 of a master device cycling a clock signal on a serial peripheral interface (SPI) clock line. The cycling of clock signal 170 over clock line 140 as discussed above is an example of act 300. In addition, the method includes an act 305 of each slave device counting responsive to the cycling of the clock signal to maintain a local count. The counting within local counters 165 by the slave devices as discussed with regard to FIG. 2 is an example of act 305. Finally, the method includes an at 310 of each slave signaling to the master device by discharging an SPI MISO line when a value for the slave device's local count equals the slave device's initial address. The discharge of MISO line 135 by a slave device embedded I2C interface 145 as discussed with regard to FIG. 2 is an example of act 310. The modified serial peripheral interface 130 in master device may then proceed to assign abbreviated addresses to the slave devices as discussed earlier.

Once the addresses are all assigned, system 100 of FIG. 1 may transition to normal operation, which may also be denoted as a mission mode of operation. Since there are no slave select lines, an access protocol for the shared MISO line 135 may be accomplished in a number of ways. In one implementation, master device 105 may periodically poll the slave devices on an individual basis. Such polling would occur through an addressed polling frame having an address header from modified SPI 130 in master device that is transmitted over MOSI line 185. Each slave device' modified SPI 130 is configured to decode the address header in the received addressed polling frame to determine if the slave device is being polled. Should a slave device be addressed by the polling frame and have frames to transmit to master device 105, it may respond to the received polling frame by temporarily discharging MISO line 135. The modified serial peripheral interface 130 in the polled slave device need not append an address header in its frames transmitted over the MISO line 135 to master device 105 since the identity of the polled slave device is known.

In an alternative access protocol implementation, each slave device may include an interrupt pin for driving an interrupt line coupled to master device 105. An example interrupt line 196 coupled between slave device 110 and master device 105. Each remaining slave device such as slave devices 115 and 120 would have their own interrupt lines (not illustrated) so that they could also interrupt master device 105. Since the identity of each slave device is known through their corresponding interrupt line, a slave device such as slave device 110 may signal its intent to transmit over MOSI line 185 by triggering an interrupt in master device 105 using its interrupt line 196. As discussed with regard to the polling for access protocol, each modified serial peripheral interface 130 in the slave devices need not insert an address header in its transmitted frames over MISO line 135 in an interrupt line access control embodiment since the transmitting slave device would be identified through its corresponding interrupt line 196.

An alternative access protocol for the slave devices may be practiced in implementations in which master device 105 networks with just three slave devices such as shown in system 100 of FIG. 1. In lieu of master device 105 assigning abbreviated addresses following the identification by each slave device of its initial address 190, master device 105 may instead assign each slave device a corresponding one of lines 140, 135 and 185 in 3-wire SPI bus 125. The assigned line functions as an interrupt or alert line for the corresponding slave device. To assign a line, modified SPI interface 130 in master device 105 may transmit a configuration frame to each slave device that is addressed using the slave device's initial address 190. The body of the configuration frame identifies the assigned line. Subsequent to the line assignment, each slave device may use the assigned line as an alert or interrupt line to alert master device 105 that the corresponding slave device intends to transmit a frame.

For example, slave device 110 of FIG. 1 may be assigned to clock line 140. Similarly, slave device 115 may be assigned to MISO line 135. Finally, slave device 120 may be assigned to MOSI line 185. The default state of each line may be high (charged to the power supply voltage VDD). During a lull period in which master device 105 is not cycling clock line 140, one of the slave devices may signal that it intends to transmit a frame by discharging its assigned line to ground. This discharge may be relatively brief such as for just the duration of a single bit in the default frame length. Modified SPI interface 130 in master device would then be alerted that the corresponding slave device has a frame to transmit upon detecting that the corresponding line in 3-wire SPI bus 125 has been discharged. For example, suppose that slave device 120 has a frame to transmit and that it has been assigned to MOSI line 185. During a lull period in which master device 105 is not toggling clock line 140, slave device 120 may then discharge MOSI line 185 for a bit period duration (or longer in alternative implementations). Modified SPI interface 130 in master device 105 is configured to respond to the temporary discharge of MOSI line 185 in such an implementation by toggling clock line 140. Modified SPI interface 130 in slave device 120 may then proceed to shift out a frame to master device 105 over MISO line 135 responsive to the cycling of clock line 140. No addressing is necessary in such a slave-generated frame since master device 105 is apprised of the identity of the originating slave device through the previous toggling low of the assigned line.

Figure 4:
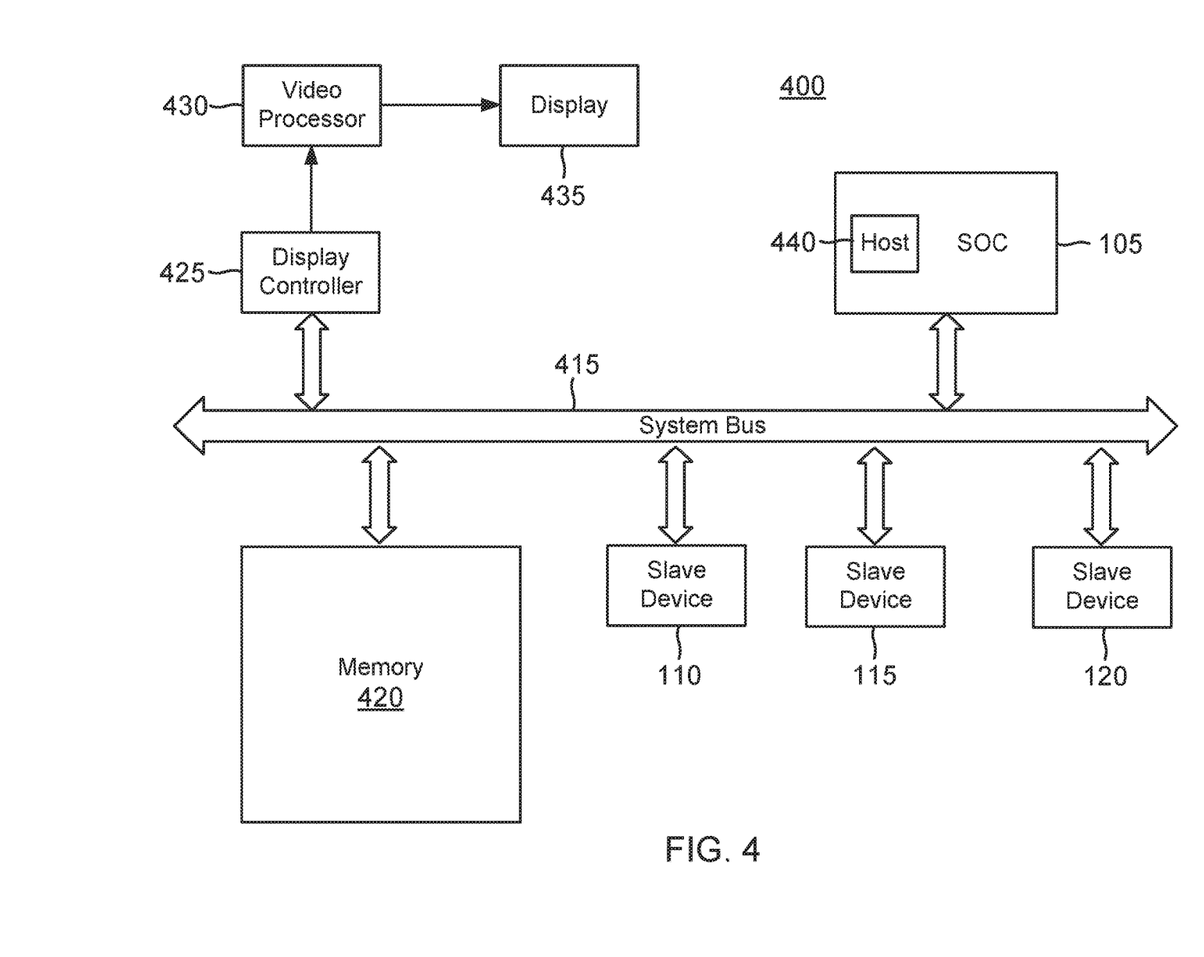
FIG. 4 is a block diagram for an example device incorporating the system of FIG. 1.

Master device 105 in system 100 of FIG. 1 may be incorporated as a system-on-a-chip (SoC) 105 into a device 400 as shown in FIG. 4. Device 400 may comprise a cellular phone, smart phone, personal digital assistant, tablet computer, laptop computer, digital camera, handheld gaming device, or other suitable device. SoC 105 communicates with slave devices 110, 115, and 120 such as sensors over a system bus 415 that also couples to a memory such as a DRAM 420 and to a display controller 425. In turn display controller 425 couples to a video processor 430 that drives a display 435. Three wires (not illustrated) in system bus 415 would thus be dedicated to the modified SPI bus 125 so that SOC 105 may communicate with slave devices 110, 115, and 120 as discussed with regard to system 100 of FIG. 1.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A master device, comprising:
a serial bus including an output line and an input line;
a serial interface configured to transmit an addressed frame to an addressed one of a plurality of slave devices over the output line and to receive non-addressed frames from each of the slave devices over the input line; and
an address assignment engine configured to operate in an address assignment mode following a power-on reset of the master device, wherein the address assignment engine includes a clock source configured to drive a clock signal into a clock line in the serial bus during the address assignment mode and includes a local counter configured to count cycles of the clock signal during the assignment mode to determine a local count, and wherein the address assignment engine is further configured to identify an address for a corresponding one of the slave devices by a value of the local count when either the input line or the output line is discharged by the corresponding one of the slave devices.

2. The master device of claim 1, wherein the address assignment engine comprises an embedded inter-integrated circuit (I2C) interface.

3. The master device of claim 1, wherein the address assignment engine comprises an embedded I3C interface.

4. The master device of claim 3, further comprising a multiplexer, wherein the multiplexer is configured to selectively couple the address assignment engine and the serial interface to the clock line and to the output line.

5. The master device of claim 1, further comprising:
a host processor, wherein the master device comprises a system-on-a-chip (SoC).

6. The master device of claim 5, wherein the SoC and the plurality of slave devices are integrated into a device selected from the group consisting of a cellular phone, a smart phone, a personal digital assistant, a tablet computer, a laptop computer, a digital camera, and a handheld gaming device.

7. The master device of claim 5, wherein the host processor is configured with software to implement the serial interface.

8. (The master device of claim 1, wherein the serial interface comprises a finite state machine.

9. The master device of claim 1, wherein serial interface is further configured to periodically poll each slave device using an addressed polling frame transmitted over the output line.

10. The master device of claim 1, further comprising a pair of input/output circuits configured to form a physical layer interface between the master device and the input line and between the master device and the output line.

11. A slave device, comprising:
a serial interface bus including an input line, an output line, and a clock line;
a serial interface configured to decode an address header in an addressed frame received over the output line from a master device to determine if the addressed frame is addressed to the slave device; and
an embedded inter-integrated circuit (I2C) interface having a counter configured to count transitions of a clock signal received on the clock line to determine a count, wherein the embedded I2C interface is further configured to discharge the input line responsive to a value for the count equaling an initial address for the slave device.

12. The slave device of claim 11, wherein the serial interface is configured to assert an interrupt signal to the master device prior to a transmission of a non-addressed frame to the master device over the input line.

13. A method, comprising:
from a master device, cycling a clock signal over a clock line to a plurality of slave devices;
in each slave device, counting responsive to the cycling of the clock signal on the clock line to maintain a local count for the slave device;
from each slave device, signaling to the master device by discharging an input line when a value for the slave device's local count equals an initial address for the slave device; and
from the master device, transmitting an addressed frame for each slave device over an output line, wherein a header in each addressed frame includes the initial address for the corresponding slave device and wherein a body of each addressed frame includes an abbreviated address for the corresponding slave device, each slave device's abbreviated address having a fewer number of bits than contained in the slave device's initial address.

14. The method of claim 13, further comprising:
transmitting an abbreviated addressed frame to a selected one of the slave devices over the output line responsive to cycles of the clock signal transmitted, wherein the abbreviated addressed frame contains an address header including the abbreviated address for the selected slave device.

15. The method of claim 13, further comprising:
in the master device, counting responsive to the cycling of the clock signal to maintain a master device local count; and
in the master device, determining each slave device's initial address through a value for the master device local count when each slave device discharges the input line.

16. The method of claim 13, further comprising:
from the master device, transmitting an addressed frame for each slave device over the output line, wherein a header in each addressed frame includes the initial address for the corresponding slave device and wherein a body of each addressed frame includes a line assignment for the corresponding slave device selected from the group consisting of the clock line, the output line, and the input line, wherein the master device is further configured to detect a temporary discharge of the assigned line by the corresponding slave device as an indication that the corresponding slave device has a frame to transmit to the master device.

* * * * *